United States Patent
Antony

(10) Patent No.: US 10,795,710 B2
(45) Date of Patent: Oct. 6, 2020

(54) HYPER-CONVERGED COMPUTING DEVICE

(71) Applicant: VMWARE, INC., Palo Alto, CA (US)

(72) Inventor: Jinto Antony, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 170 days.

(21) Appl. No.: 15/795,285

(22) Filed: Oct. 27, 2017

(65) Prior Publication Data

US 2019/0018700 A1 Jan. 17, 2019

(30) Foreign Application Priority Data

Jul. 17, 2017 (IN) .............................. 201741025355

(51) Int. Cl.
*G06F 9/455* (2018.01)
*H04L 12/931* (2013.01)
*H04L 29/08* (2006.01)
*G06F 9/451* (2018.01)
*H04L 12/46* (2006.01)

(52) U.S. Cl.
CPC .......... *G06F 9/45558* (2013.01); *G06F 9/452* (2018.02); *H04L 49/70* (2013.01); *H04L 67/1097* (2013.01); *G06F 2009/45579* (2013.01); *G06F 2009/45595* (2013.01); *H04L 12/4633* (2013.01); *H04L 67/04* (2013.01); *H04L 67/08* (2013.01)

(58) Field of Classification Search
CPC ................................................. G06F 9/45533
USPC .......................................................... 718/1
See application file for complete search history.

(56) References Cited

U.S. PATENT DOCUMENTS

| | | | | |
|---|---|---|---|---|
| 9,021,475 B2* | 4/2015 | Nimmagadda | ....... | G06F 9/5077 718/1 |
| 9,778,865 B1* | 10/2017 | Srinivasan | ............ | G06F 3/0619 |
| 10,108,560 B1* | 10/2018 | Lamb | .................... | G06F 3/0607 |
| 2008/0005414 A1* | 1/2008 | Liu | ......................... | G06F 3/023 710/62 |
| 2008/0201479 A1* | 8/2008 | Husain | .................... | G06F 9/445 709/227 |
| 2011/0131573 A1* | 6/2011 | Antony | ................... | G06F 3/023 718/1 |
| 2015/0058853 A1* | 2/2015 | Antony | ................... | G06F 3/023 718/1 |
| 2015/0180714 A1* | 6/2015 | Chunn | ................ | H04L 67/1097 709/221 |
| 2016/0055579 A1* | 2/2016 | McDonough | ....... | G06F 9/45558 705/37 |
| 2018/0046503 A1* | 2/2018 | Feng | ..................... | G06F 9/5033 |

\* cited by examiner

*Primary Examiner* — Mehran Kamran

(57) ABSTRACT

Techniques for providing a hyper-converged computing device with an integrated central virtualization switch is disclosed. In one embodiment, the hyper-converged computing device includes a server comprising at least one central processing unit (CPU), memory, and storage, a central virtualization switch integrated with the server, a virtualization application to manage virtual machines hosted by the hyper-converged computing device, and a hyper-converged application to manage the hyper-converged computing device. The hyper-converged application is to appropriately route data associated with an exclusive communication between the virtual machines and peripheral devices through the central virtualization switch that is integrated with the server.

28 Claims, 6 Drawing Sheets

HYPER-CONVERGED COMPUTING DEVICE

RELATED APPLICATIONS

Benefit is claimed under 35 U.S.C. 119(a)-(d) to Foreign Application Serial No. 201741025355 filed in India entitled "HYPER-CONVERGED COMPUTING DEVICE", on Jul. 17, 2017, by VMware, Inc., which is herein incorporated in its entirety by reference for all purposes.

TECHNICAL FIELD

The present disclosure relates to a computer network virtualization environment, and more particularly to methods, techniques, and systems for providing a hyper-converged computing device for supporting the computer network virtualization environment.

BACKGROUND

Computer virtualization is a technique that involves encapsulating a representation of a physical computing machine platform into a virtual machine (VM) that is executed under the control of virtualization software running on hardware computing platforms (also referred to herein as "host computing systems" or "servers"). A group of hardware computing platforms may be organized as a cluster to provide hardware resources, such as memory, central processing units (CPUs) and so on, for VMs. Each VM is a complete execution environment, and the server provides a user interface over the network connection so that user inputs and outputs are communicated between the user and the VM.

Computer network virtualization environment (e.g., virtual desktop infrastructure (VDI), VMware View, and the like) may utilize thin clients at the user-end to access virtual desktops associated with users. The virtual desktops may be displayed in VMs that the users may communicate with through the thin clients. The VMs may reside on a host computing system/server to which a network switch may be coupled to.

Figure 1A:
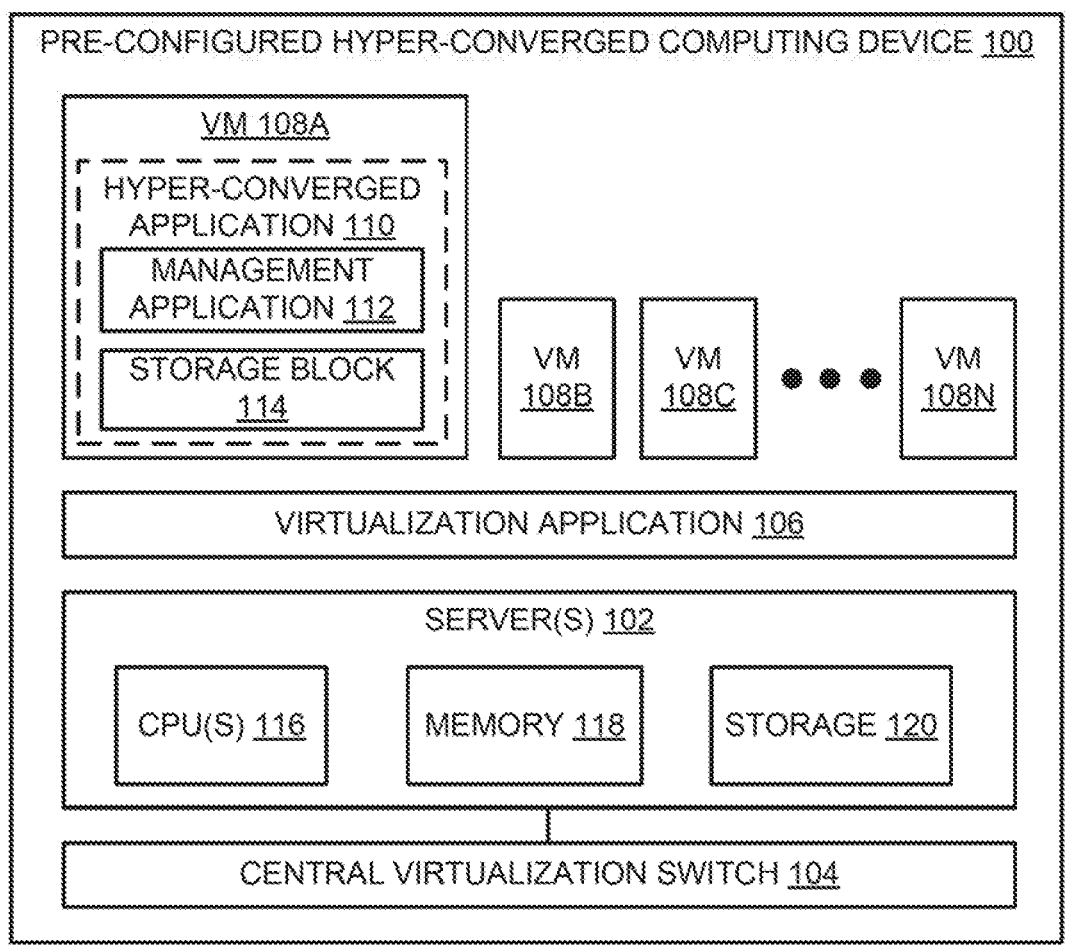
FIG. 1A depicts a block diagram of an example hyper-converged computing device for supporting a computer network virtualization environment.

The drawings described herein are for illustration purposes only and are not intended to limit the scope of the present subject matter in any way.

DETAILED DESCRIPTION

Embodiments described herein may provide an enhanced computer-based and network-based method, technique, and system for providing a hyper-converged computing device to interface/couple virtual machines (VMs) to user-end peripheral devices. Computer network virtualization environment may utilize thin clients at the user-end to access virtual desktops associated with users. The virtual desktops may be displayed in the VMs that the users may communicate with through the thin clients. The thin clients may be low-end desktop computers, which may merely be used to connect to the remote desktops through a remote desktop connection (e.g., Microsoft®'s remote desktop protocol (RDP) connection, VMware Blast Extreme Protocol) or a web interface. The thin clients may connect to the remote desktops through a computer network (e.g., Internet, local area network (LAN), wide area network (WAN) and the like). A remote desktop connection may be required for the purpose, as discussed above. Further, the VMs may reside on a server to which a network switch may be coupled to.

In thin client based solutions, network switches, thin clients, and the like, are needed for supporting the computer network virtualization environment. In such cases, the user may need to boot the thin client to connect to the virtual desktop. Hence, there may be some latency associated with connecting to the remote desktops. Patch management may also be required at the thin client end as the thin clients may include operating systems. Further, a user, such as an IT administrator, may require a high level and complex skill set to effectively create and manage the VMs in such environments.

Examples described herein may provide a hyper-converged computing device including a central virtualization switch that can eliminate the need for a separate physical switch and thin clients for virtual desktops deployments. The hyper-converged computing device may include a server and a centralized virtualization switch coupled/integrated to the server to form a hyper converged hardware. Further, the hyper-converged computing device may include hyper converged software that can run on top of the hyper converged hardware.

In one example, the hyper-converged computing device may include the server (e.g., having at least one central processing unit (CPU), memory, storage, and the like), the central virtualization switch integrated with the server, a virtualization application to manage VMs hosted by the hyper-converged computing device, and a hyper-converged application running in one of the VMs to manage the hyper-converged computing device. The hyper-converged application may appropriately route data associated with an exclusive communication between the VMs and peripheral devices through the hyper-converged computing device (e.g., through the central virtualization switch that is integrated with the server). Examples described herein may replace the servers and physical switches with the hyper-converged computing device, thereby eliminating the need for the separate physical switches and the thin clients.

System Overview and Examples of Operation

FIG. 1A depicts a block diagram of an example hyper-converged computing device 100 for supporting a computer network virtualization environment. Example computer network virtualization environment may include a virtual desktop infrastructure (VDI), VMware View, and the like. As shown in FIG. 1A, hyper-converged computing device 100 may include a server(s) 102 and a central virtualization switch 104 integrated/coupled to server 102. Example server 102 may include CPU(s) 116, memory 118, and storage 120. It should be appreciated that hyper-converged computing device 100 may include multiple servers, each including a CPU, memory, and storage. Hyper-converged computing device 100 may be scalable. That is hyper-converged computing device 100 can be scaled to include more than one server. For example, hyper-converged computing device 100 can initially have a single server, and then additional server may be included in hyper-converged computing device 100.

Further, hyper-converged computing device 100 may include a virtualization application 106 to manage VMs 108A-N hosted by hyper-converged computing device 100. Example virtualization application 106 may include a hypervisor (e.g., a VMware ESX™ hypervisor, a VMware ESXi™ hypervisor, and the like). Hypervisor may be installed on top of hardware platform and supports a VM execution space within which one or more VMs may be concurrently instantiated and executed. Each VM implements a virtual hardware platform that supports the installation of a guest operating system (OS) which is capable of executing applications. Hyper-converged computing device 100 may also host one or more containers 152. Example container 152 may be a data computer node that runs on top of a server OS without the need for a hypervisor or separate OS.

Furthermore, hyper-converged computing device 100 may include a hyper-converged application 110 to manage hyper-converged computing device 100. For example, hyper-converged application 110 may include a management application 112 and a storage block 114. Management application 112 may include a suite of software to support virtualized computing (e.g., VMware vSphere™, vCenter™, vRealize Suite, and the like) that utilizes various components such as a VMware ESX/ESXi hypervisor. Further, storage block 114 is a logical partition of storage (e.g., storage 120) in hyper-converged computing device 100. In other words, storage block 114 is virtual storage. Example storage block 114 may include a virtual storage area network (vSAN). In another example, storage block 114 can be embedded with or integral to virtualization application 106.

Figure 1B:
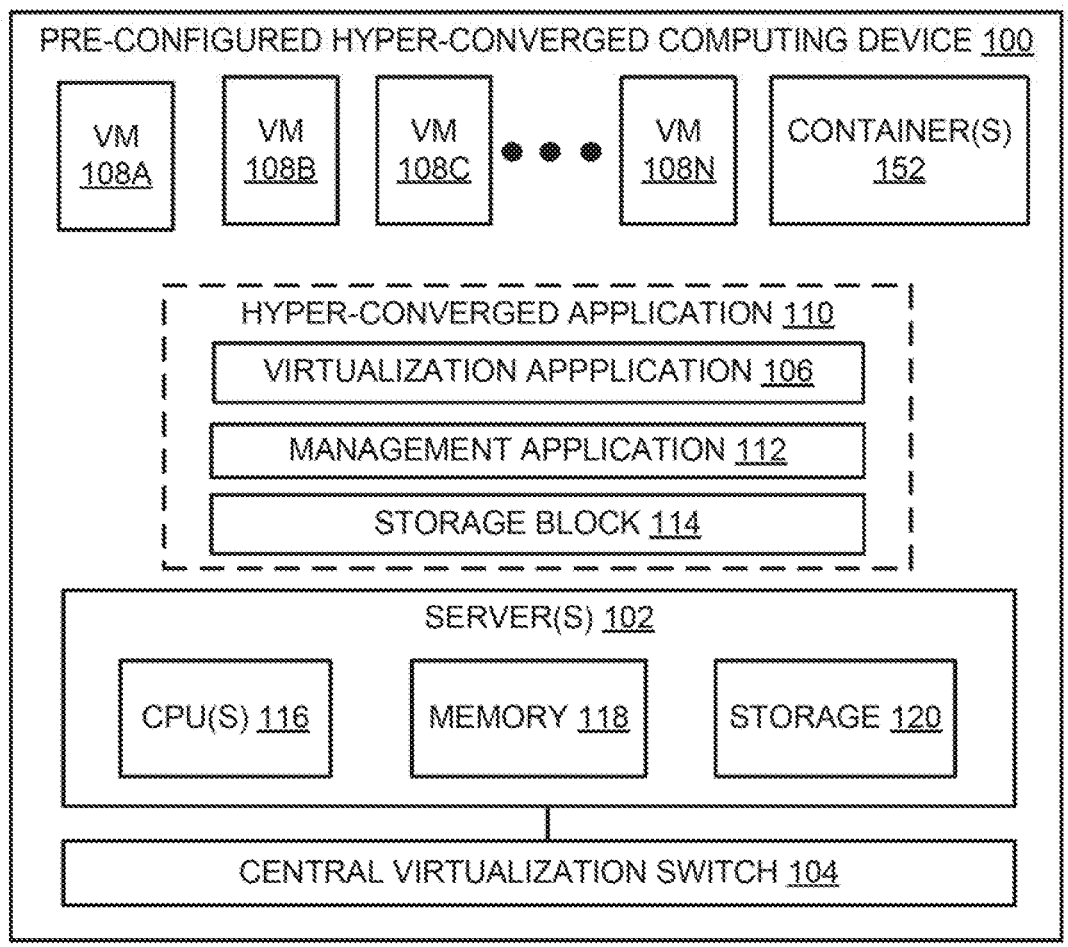
FIG. 1B depicts a block diagram of another example hyper-converged computing device for supporting the computer network virtualization environment.

In one example, hyper-converged application 110 may be executed in one of VMs 108A-N (e.g., VM 108A as shown in FIG. 1A) or a container 152. In another example, hyper-converged application 110 may be installed directly on hyper-converged computing device 100 as shown in FIG. 1B. In FIG. 1B, hyper-converged application 110 can be stored in memory 118 or storage 120 and executed by one or more CPUs 116. Further as shown in FIG. 1B, virtualization application 106 can be implemented as a part of hyper-converged application 110.

In other examples, hyper-converged application 110 may be installed in a single server or may be distributed across various servers. In yet another example, hyper-converged application 110 may be stored in hyper-converged computing device 100 but is outside of servers 102. Hyper-converged application 110 may be executed by one or more CPUs in a single server or the execution may be distributed amongst various CPUs in various servers of hyper-converged computing device 100.

Figure 2:
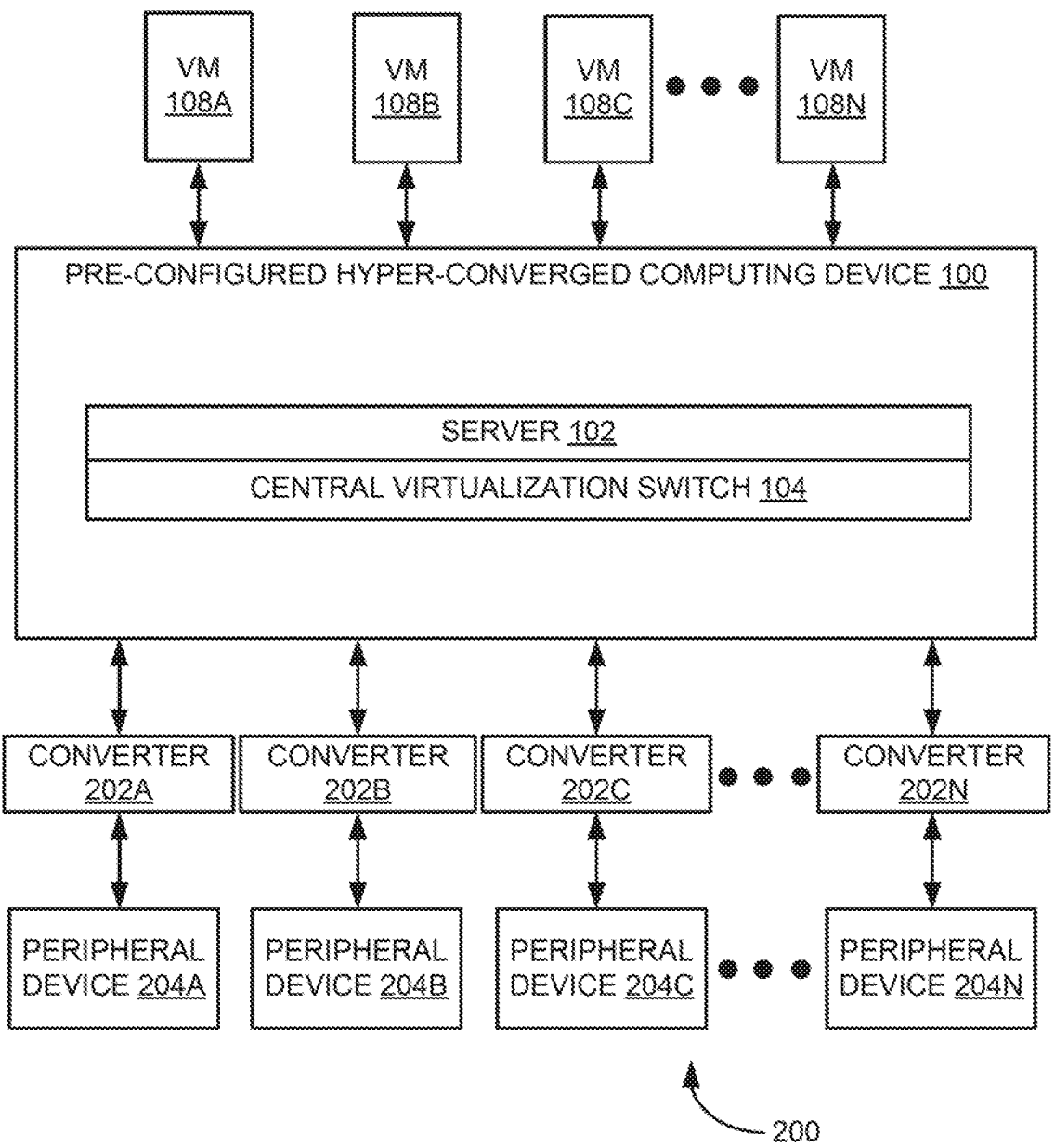
FIG. 2 is an example computer network virtualization environment illustrating routing data associated with an exclusive communication between VMs and peripheral devices through the hyper-converged computing device.

During operation, hyper-converged application 110 may appropriately route data associated with an exclusive communication between VMs 108A-N and peripheral devices (e.g., 204A-N as shown in FIG. 2) through central virtualization switch 104 that is integrated with server 102. Example operation is explained with respect to FIG. 2.

FIG. 2 is an example computer network virtualization environment 200 illustrating routing data associated with an exclusive communication between VMs 108A-N and peripheral devices 204A-N through hyper-converged computing device 100. For example, the direct and exclusive communication between VMs 108A-N and peripheral devices 204A-N may include transmitting the data from VMs 108A-N to a corresponding one of peripheral devices 204A-N and/or transmitting the data from peripheral devices 204A-N to a corresponding one of VMs 108A-N.

In one example, VMs 108A-N may be virtualized desktops associated with the end users who may communicate exclusively with VMs 108A-N directly through the corresponding peripheral devices 204A-N. For example, there may be a direct and exclusive communication between peripheral device 204A and VM 108A, peripheral device 204B and VM 108B, peripheral device 204C and VM 108C, peripheral device 204N and VM 108N and the like. Example peripheral device may be a physical keyboard, video, mouse (KVM), i.e., a physical keyboard, a physical video display unit (or computer monitor), and a physical mouse or any combination of a physical keyboard, a computer monitor, a physical mouse and any other input/output (IO) unit/universal serial bus (USB) port that may be used by the end user. Peripheral devices 204A-N may be connected to hyper-converged computing device 100 through the computer network (e.g., Internet, local area network (LAN), wide area network (WAN), and the like). In another example, hyper-converged computing device 100 may host containers (e.g., 152 as shown in FIG. 1B) that are associated with the end users who may communicate exclusively with containers 152 directly through the corresponding peripheral devices.

Figure 3:
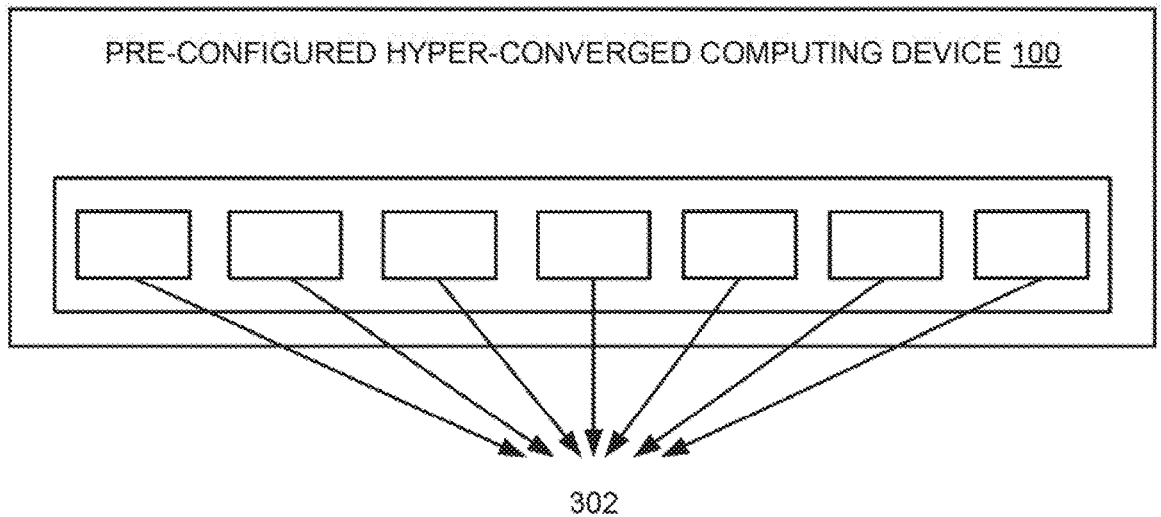
FIG. 3 is a schematic view of the hyper-converged computing device depicting converter interfaces.

As shown in FIG. 2, computer network virtualization environment 200 may include converters 202A-N that are interfaced with peripheral devices 204A-N. Further, hyper-converged computing device 100 may be coupled to converters 202A-N through converter interfaces (e.g., converter interfaces 302 as shown in FIG. 3). Example converter interfaces 302 may include ports available on integrated central virtualization switch 104 of hyper-converged computing device 100 that are configured to couple to converters 202A-N interfaced with peripheral devices 204A-N.

In one example, each converter 202A-N is a KVM converter configured to convert the peripheral signal to a keyboard compatible signal, a video compatible signal, and a mouse compatible signal and vice versa. Example converter may be a PS/2+video to CAT5 dongle, a PS/2+video CAT6 dongle, a USB+video dongle, PS/2 dongle and/or a PS/2/USB+video cable to convenience compatibility with peripheral devices 204A-N such as keyboards, computer monitors, mouse and other user end devices.

In one example, hyper-converged computing device 100 may couple to converters 202A-N through a registered jack (RJ) 45 interface. In another example, wireless coupling between hyper-converged computing device 100 and converters 202A-N may also be employed.

During operation, hyper-converged application 110 may receive packet data from VMs 108A-N and separate the packet data intended for peripheral devices 204A-N at integrated central virtualization switch 104 based on an identification data associated with VMs 108A-N. In one or more embodiments, for example, a transmission control protocol (TCP) port number may be utilized as the identification data associated with VMs 108A-N.

Further, hyper-converged application 110 may combine the packet data associated with the communication between VMs 108A-N and the corresponding peripheral devices 204A-N. In this example, the separated packet data associated with each VM 108A-N may be combined at integrated central virtualization switch 104. Further, the combined packet data may be processed to generate a peripheral signal configured to be input to the appropriate converter 202A-N. In one or more embodiments, the peripheral signal may be input to the appropriate converter 202A-N through the appropriate converter interface 302 (e.g., RJ45 interface). Further, the peripheral signal associated with the exclusive communication between VM 108A-N and corresponding peripheral device 204A-N may need to be converted to an appropriate format that is recognizable by peripheral device 204A-N (e.g., keyboard, video, mouse) using corresponding converter 202A-N.

An example operation is described below with respect to VM 108B. In this example, hyper-converged application 110 may receive a data packet from VM 108B. The data packet may be received in a first format that is compatible with a virtual desktop being run in VM 108B. Example packet data may be transmission control protocol/Internet protocol (TCP/IP) packets. Further, hyper-converged application 110 may determine identification information for VM 108B. Then, hyper-converged application 110 may determine a peripheral device (e.g., 204B) that corresponds to the virtual desktop based on the identification information. The identification information (e.g., media access control (MAC) address) may be assigned to each of VMs 108A-N by hyper-converged computing device 100.

Further, hyper-converged application 110 may generate a peripheral signal from the data packet that is configured to be sent to peripheral device 204B. The peripheral signal is in a second format compatible with peripheral device 204B. Furthermore, hyper-converged application 110 may redirect the peripheral signal to a converter interface 302 specific to VM 108B. Then, the peripheral signal can be routed to peripheral device 204B through converter interface 302. Peripheral device 204B may process the peripheral signal for the virtual desktop being run in VM 108B. In some examples, peripheral device 204B may process the peripheral signal without establishing a virtual desktop session with the virtual desktop via a connection using the first format.

In one example, the second format is compatible with a converter (e.g., 202B) that is coupled to peripheral device 204B. In this example, hyper-converged application 110 may send the peripheral signal to converter 202B. Converter 202B may convert the peripheral signal into a third format compatible with peripheral device 204B. In this example, the third format may include keyboard compatible signal, a video compatible signal, and/or a mouse compatible signal.

In another example, consider that converter 202B is coupled to a set of peripheral devices. In this example, each peripheral device in the set of peripheral devices may communicate in a different type of the third format, and converter 202B may convert the peripheral signal to a type of the third format associated with peripheral device 204B.

Further, hyper-converged application 110 may receive a peripheral signal from peripheral device 204B, for instance, through converter 202B. In this example, converter 202B may convert input from peripheral device 204B in the third format to the peripheral signal. Hyper-converged application 110 may determine VM 108B that corresponds to peripheral device 204B (e.g., using identification information). Hyper-converged application 110 may generate a data packet from the peripheral signal for VM 108B. Hyper-converged application 110 may send the data packet to VM 108B. VM 108B may process the data packet for the virtual desktop being run in VM 108B.

Similarly, the hyper-converged application may appropriately route data associated with an exclusive communication between the container(s) 152 (i.e., hosted by hyper-converged computing device 100) and a corresponding one of the peripheral devices through central virtualization switch 104 that is integrated with server 102.

Therefore, in some examples, the above-mentioned direct communication between VM 108B, which may be a virtualized desktop associated with a user, and a corresponding peripheral device 204B configured to be operated by the user may allow for dispensing with the need for a thin client at the user-end in a computer network virtualization environment 200. In one or more embodiments, the utilization of hyper-converged computing device 100 including integrated central virtualization switch 104 may facilitate the users to access the virtualized desktops (i.e., VMs 108A-N) without any non-peripheral device hardware at the user-end. In one or more embodiments, converters 202A-N may suffice at the user-end.

Further, the user-end requirement of booting the thin clients and connecting to the remote desktops using, for example, Microsoft®'s remote desktop protocol (RDP) connection, VMware Blast Protocol, or a web interface may be dispensed with. In one or more embodiments, hyper-converged computing device 100 including integrated central virtualization switch 104 may be utilized to seamlessly switch between VMs 108A-N and the corresponding peripheral devices 204A-N.

Assuming a thin client based solution in a computer network virtualization environment where there are 24 users and 1 server, 24 thin clients, along with 1 network switch, may be required. In one or more embodiments, assuming the same number of users in the computer network virtualization environment 200 shown in FIG. 2, the computer network virtualization environment 200 may merely require 24 user-end converters 202A-N (e.g., PS/2 CAT5 dongles), along with hyper-converged computing device 100. In one or more embodiments, user-end converters 202A-N may be more portable compared to the traditional thin clients. Additionally, in one or more embodiments, the lack of thin clients in the computer network virtualization environment 200 may provide for savings associated with hardware costs. Also, latency associated with connecting to the remote desktop using, for example, Microsoft®'s RDP connection in the case of a thin client based solution may be a non-issue in the computer network virtualization environment 200 of FIG. 2.

Furthermore, an end-user need to do patch management in a thin client based solution may also be a non-issue in the computer network virtualization environment 200. In this example, the only user-end task required in the computer network virtualization environment 200 may be a conversion of a peripheral signal to a format recognizable by the peripheral devices 204A-N. Also, the user-end processing required in traditional thin client based solutions may be shifted to hyper-converged computing device 100 in the computer network virtualization environment 200. Therefore, the additional functionality associated with hyper-converged computing device 100 may pave the way for a centralized approach to desktop virtualization as the need for user-end hardware and a separate physical switch can be dispensed with. Hyper-converged computing device 100 implementation may provide for improved security in the computer network virtualization environment 200 as a user may not be able to access the virtual desktop associated with another user because only data associated with the exclusive communication between user-end peripheral devices 204 and a VM 108 may be available to the user.

Based on the pre-configured hardware and software disposed within hyper-converged computing device 100, hyper-converged computing device 100 may enable a user to simply and quickly create a virtualization infrastructure and deploy VMs shortly after hyper-converged computing device 100 is powered on for the first time. Hyper-converged computing device 100 as described herein can be a single rackable enclosure, a two-rack unit-four node (2U/4N) device, or a four-rack unit-four node (4U/4N) device. Hyper-converged computing device 100 as described herein can be offered for sale as a single stock keeping unit (SKU).

Figure 4:
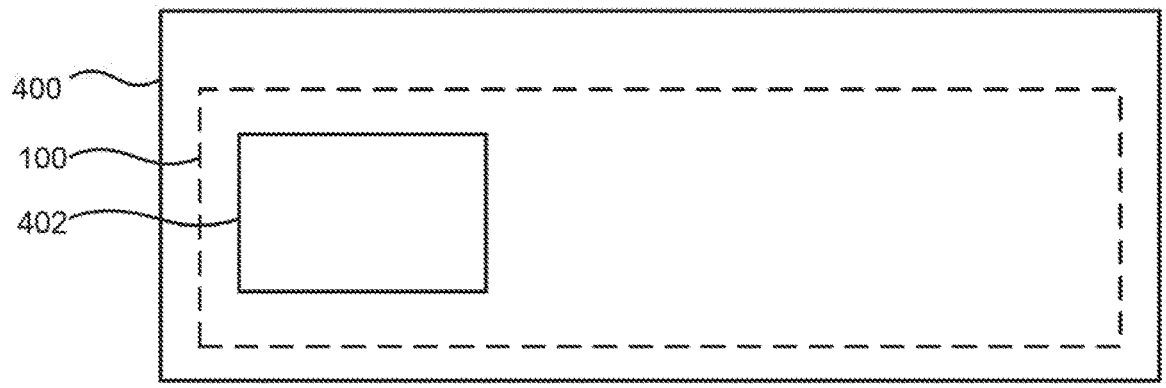
FIG. 4 depicts a block diagram of a side-view of the example hyper-converged computing device that is offered for sale as a single stock keeping unit.

FIG. 4 depicts a block diagram of a side-view of the example hyper-converged computing device 100 that is offered for sale as a single SKU 402. For example, hyper-converged computing device 100 is disposed in packaging 400 and SKU 402 is on packaging 400. Accordingly, hyper-converged computing device 100 is offered for sale as a single SKU.

In one embodiment, hyper-converged computing device 100, as described herein, is pre-configured with the requisite hardware including central virtualization switch 104 and software (e.g., virtualization application 106 and hyper-converged application 110) for employing a virtualization infrastructure. Therefore, subsequent the purchase of hyper-converged computing device 100 as a single SKU, hyper-converged computing device 100 is not required to include any additional hardware and/or software to support and manage the virtualization infrastructure.

Upon powering on hyper-converged computing device 100 for the first time, a single end-user license agreement (EULA) is displayed to an end-user. Because software module hyper-converged application 110 is proprietary to a single entity (e.g., VMware™), only a single EULA, provided by the single entity, is displayed to the purchasing end-user. The EULA establishes the purchaser's right to use the software (e.g., hyper-converged application 110) and the hardware of hyper-converged computing device 100. Upon acceptance of the EULA, hyper-converged computing device 100 is enabled to operate and manage a virtualization infrastructure, and deploy VMs in the virtualization infrastructure.

For example, upon first powering on hyper-converged computing device 100 and accepting the single EULA, a virtualization infrastructure is able to be rapidly created and a VM is able to be deployed within the virtualization infrastructure within minutes (e.g., 15 minutes). Moreover, the virtualization infrastructure is able to be managed and controlled by an end-user that is not required to have high-level IT administrative training and experience.

In another embodiment, hyper-converged computing device 100 is pre-configured with the requisite hardware including one or more servers 102 and the central virtualization switch 104 and can be offered for sale as a single SKU. In this case, subsequent the purchase of hyper-converged computing device 100 as the single SKU, virtualization application 106 and hyper-converged application 110 can be configured when hyper-converged computing device 100 is powered on for the first time.

In one example, hyper-converged application 110 may be implemented as engines or modules comprising any combination of hardware and programming to implement the functionalities described herein. Hyper-converged application 110 can be a service process in the management application or can be an appliance running in the data center to cater multiple management applications in a cloud based environment. For example, management application may be VMware vSphere™, VCenter™, and the like that are offered by VMware. Management application can be provided in server, VM, or container. Example container is a data computer node that runs on top of a server OS without the need for a hypervisor or separate OS.

In some examples, the functionalities described herein, in relation to instructions to implement functions of hyper-converged application 110 and any additional instructions described herein in relation to the storage medium, may be implemented as engines or modules comprising any combination of hardware and programming to implement the functionalities of the modules or engines described herein. The functions of hyper-converged application 110 may also be implemented by the processor. In examples described herein, the processor may include, for example, one processor or multiple processors included in a single device or distributed across multiple devices.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Although certain terms are used primarily herein, other terms could be used interchangeably to yield equivalent embodiments and examples. For example, the term "host computing system" may be used interchangeably with "physical host", "physical machine" or "physical device". Further, the terms "dynamic" and "automatic" are also used interchangeably throughout the document. Further for example, it is well-known that equivalent terms in the field of system virtualization or similar or related fields could be substituted for such terms as "physical computer," "hypervisor," "VM," or the like. Furthermore, the terms "cluster" may refer to a group of host computing systems that work together in a physical or virtual computing environment.

EXAMPLE PROCESSES

Figure 5A:
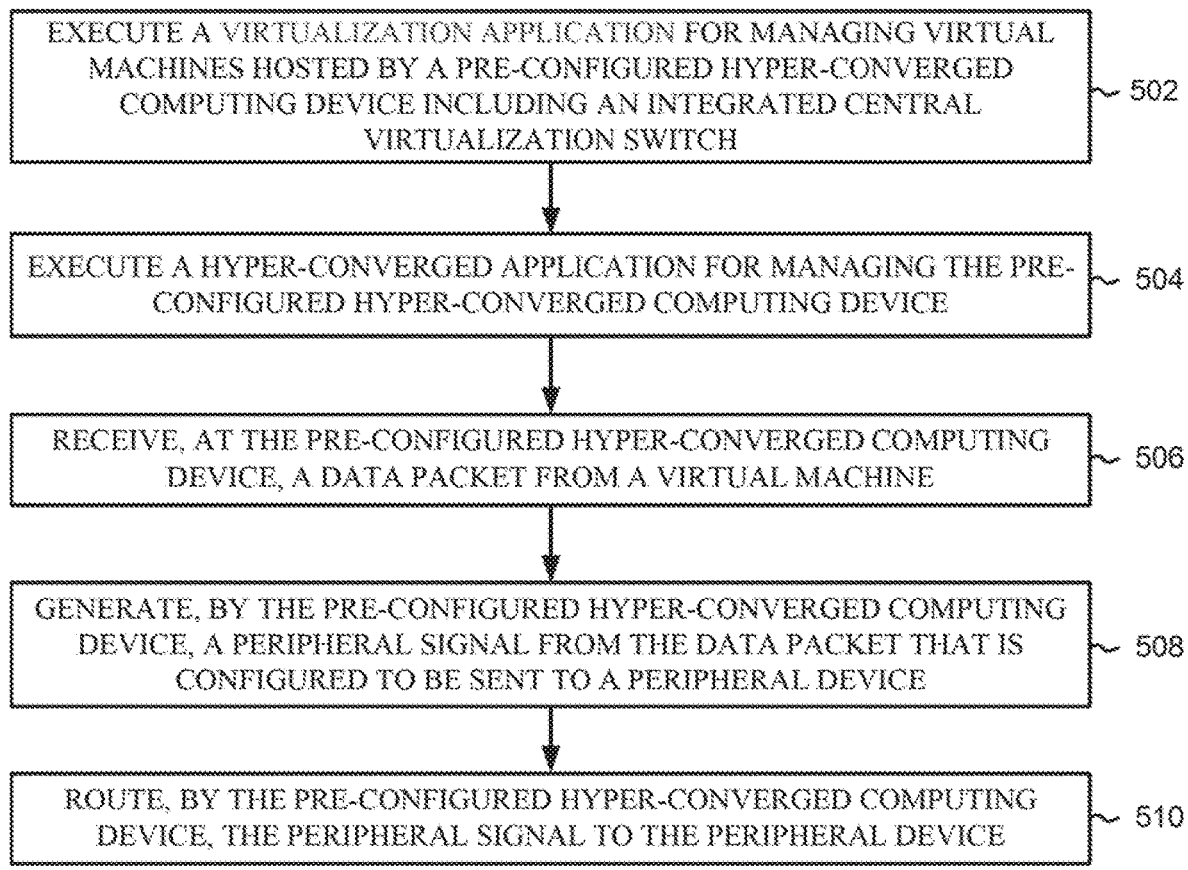
FIGS. 5A and 5B illustrate flow diagrams of an example method for interfacing/coupling VMs to user-end peripheral devices through a hyper-converged computing device.
Figure 5B:
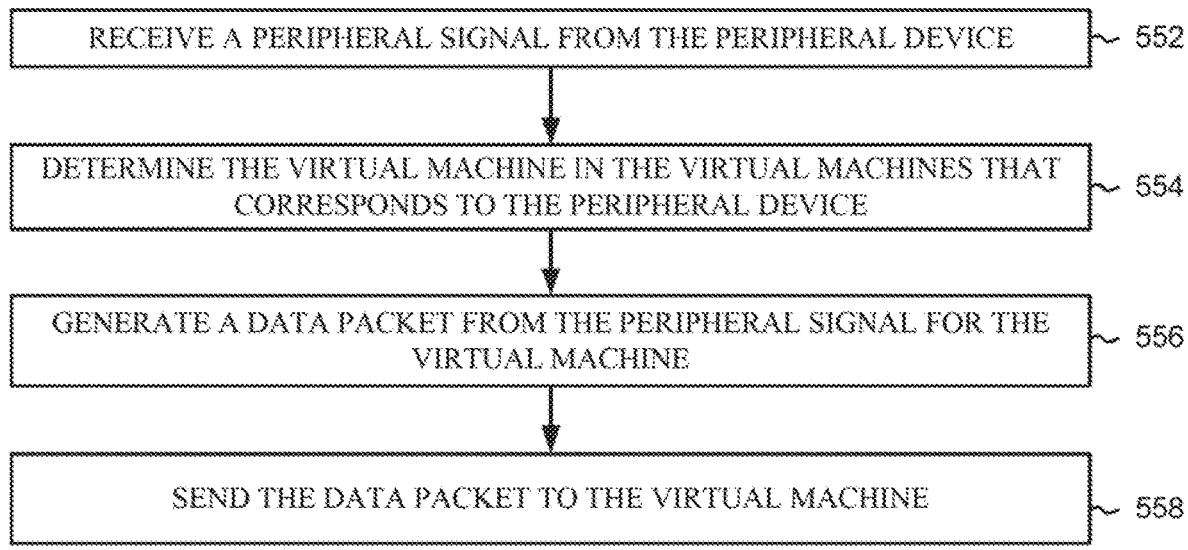

FIGS. 5A and 5B illustrate flow diagrams 500A and 500B of an example method for interfacing/coupling VMs to user-end peripheral devices through a hyper-converged computing device. It should be understood that the process depicted in FIGS. 5A and 5B represent generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

Particularly, FIG. 5A illustrates routing data associated with an exclusive communication from the VMs to the peripheral devices by the hyper-converged computing device. At 502, a virtualization application may be executed for managing VMs hosted by the hyper-converged computing device including an integrated central virtualization switch.

At 504, a hyper-converged application may be executed for managing the hyper-converged computing device. In one example, the hyper-converged application is executed in one of the VMs. In one embodiment, the hyper-converged computing device may include pretested, preconfigured, and pre-integrated one or more servers, the central virtualization switch, the virtualization application, and the hyper-converged application. Each server may include at least one CPU, memory, and storage. Example virtualization application may be a hypervisor. Example hyper-converged application may include a management application and a vSAN. In another embodiment, the hyper-converged computing device may include pretested, preconfigured, and pre-integrated one or more servers and the central virtualization switch. In this case, the virtualization application and the hyper-converged application are configured on the hyper-converged computing device when the hyper-converged computing device is powered on for the first time.

At 506, a data packet may be received, at the hyper-converged computing device, from a VM of the VMs. The data packet may be received in a first format compatible with a virtual desktop being run in the VM.

At 508, a peripheral signal may be generated, by the hyper-converged computing device, from the data packet that is configured to be sent to a peripheral device that corresponds to the virtual desktop. The peripheral signal may be in a second format compatible with the peripheral device. In one example, the peripheral signal may be generated by deciphering the data packet of the VM and converting the deciphered data packet of the VM into the peripheral signal.

In one example, identification information may be determined for the VM. Further, the peripheral device that corresponds to the virtual desktop may be determined based on the identification information. Furthermore, the peripheral signal may be generated from the data packet that is configured to be sent to the peripheral device.

At 510, the peripheral signal may be routed to the peripheral device by the hyper-converged computing device. The peripheral device may process the peripheral signal for the virtual desktop being run in the VM. In one example, prior to routing the peripheral signal to the peripheral device, the peripheral signal may be redirected to a converter interface of the hyper-converged computing device specific to the VM.

In one example, the second format is compatible with a converter that is coupled to the peripheral device. In this example, routing the peripheral signal to the peripheral device may include sending the peripheral signal to the converter via the converter interface. The converter may be configured to convert the peripheral signal into a third format compatible with the peripheral device. Example converter may be a KVM converter configured to convert the peripheral signal to a third format (e.g., keyboard compatible signal, a video compatible signal and a mouse compatible signal) and/or vice versa.

FIG. 5B illustrates routing data associated with an exclusive communication from the peripheral devices to the VMs by the hyper-converged computing device. At 552, a peripheral signal may be received from the peripheral device. At 554, the VM that corresponds to the peripheral device may be determined. At 556, a data packet may be generated from the peripheral signal for the VM. At 558, the data packet may be sent to the VM. The VM may process the data packet for the virtual desktop being run in the VM.

Although the flow diagram of FIGS. 5A and 5B illustrate specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter.

Figure 6:
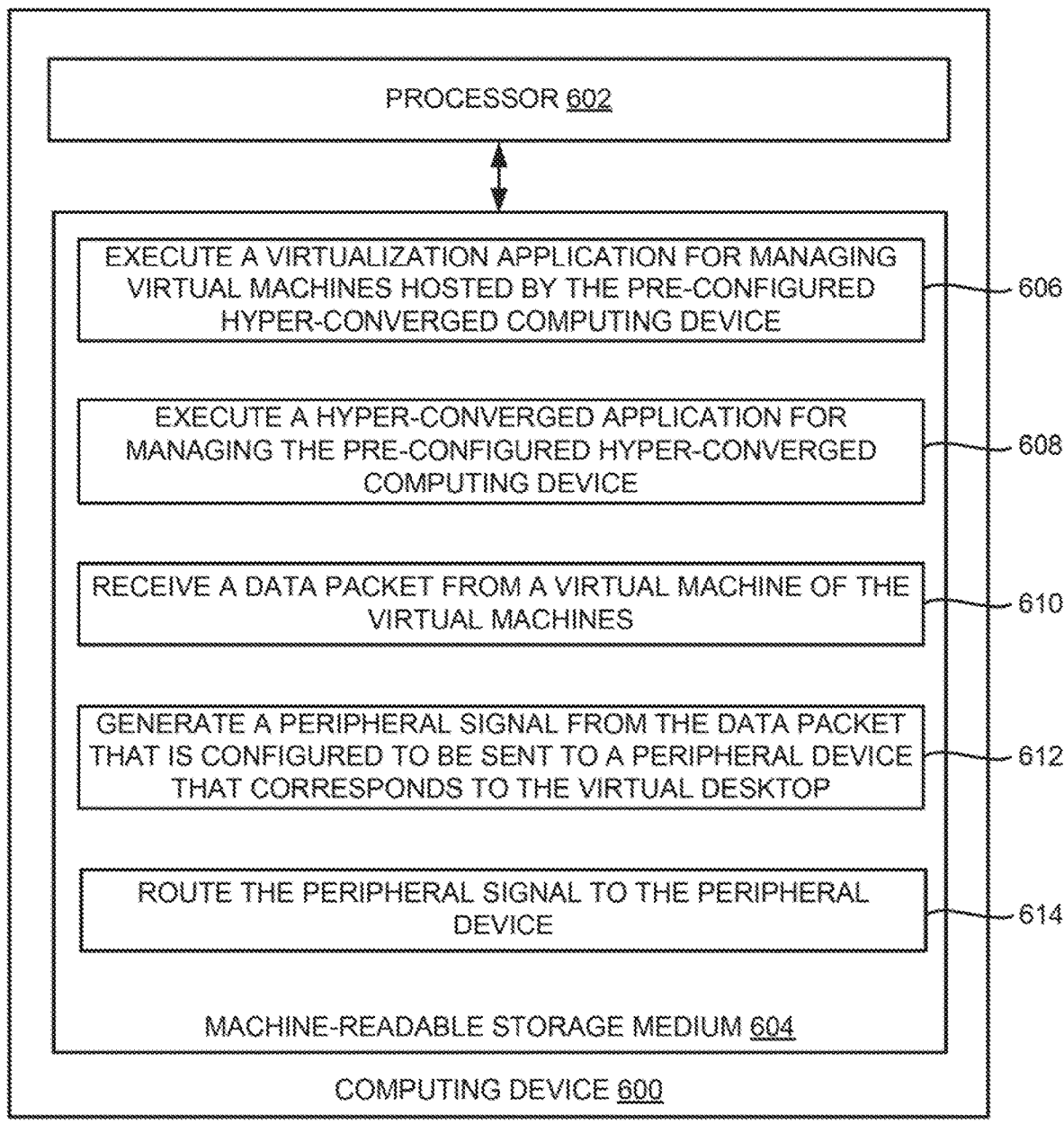
FIG. 6 is a block diagram of an example computing device including non-transitory computer-readable storage medium storing instructions to interface/couple VMs to user-end peripheral devices.

FIG. 6 is a block diagram of an example computing device 600 (e.g., hyper-converged computing device 100 as shown in FIGS. 1 and 2) including a non-transitory computer-readable storage medium 604 storing instructions to interface/couple VMs to user-end peripheral devices.

The computing device 600 includes a processor 602 and machine-readable storage medium 604 communicatively coupled through a system bus. The processor 602 may be any type of CPU, microprocessor, or processing logic that interprets and executes machine-readable instructions stored in the machine-readable storage medium 604. The machine-readable storage medium 604 may be a random-access memory (RAM) or another type of dynamic storage device that may store information and machine-readable instructions that may be executed by the processor 602. For example, the machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 604 may be a non-transitory machine-readable medium. In an example, the machine-readable storage medium 604 may be remote but accessible to the computing device 600.

The machine-readable storage medium 604 may store instructions 606 to 614. In an example, instructions 606 to 614 may be executed by processor 602 to control the hyper-converged computing device to perform instructions 606 to 614. Instructions 606 may be executed by processor 602 to execute a virtualization application for managing VMs hosted by the hyper-converged computing device including an integrated central virtualization switch. Instructions 608 may be executed by processor 602 to execute a hyper-converged application for managing the hyper-converged computing device.

Instructions 610 may be executed by processor 602 to receive a data packet from a VM of the VMs, the data packet received in a first format compatible with a virtual desktop being run in the VM. Instructions 612 may be executed by processor 602 to generate a peripheral signal from the data packet that is configured to be sent to a peripheral device that corresponds to the virtual desktop, the peripheral signal in a second format compatible with the peripheral device. Instructions 614 may be executed by processor 602 to route the peripheral signal to the peripheral device, the peripheral device processing the peripheral signal for the virtual desktop being run in the VM.

Further, the machine-readable storage medium 604 may include instructions to receive a peripheral signal from the peripheral device, determine the VM in the VMs that corresponds to the peripheral device, generate a data packet from the peripheral signal for the VM, and send the data packet to the VM, the VM processing the data packet for the virtual desktop being run in the VM.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A hyper-converged computing device for supporting a computer network virtualization environment comprising:
    a server comprising at least one central processing unit (CPU), memory, and storage;
    a central virtualization switch, wherein the server and the central virtualization switch are pretested, preconfigured, and pre-integrated;
    a virtualization application to manage virtual machines hosted by the hyper-converged computing device; and
    a hyper-converged application to manage the hyper-converged computing device, wherein the hyper-converged application is configured to:
        receive, at the hyper-converged computing device by the hyper-converged application, a data packet from a virtual machine of the virtual machines, the data packet received in a first format compatible with a virtual desktop being run in the virtual machine, wherein a plurality of peripheral devices connects directly to the hyper-converged computing device, wherein the plurality of peripheral devices comprises a keyboard, a video display unit and a mouse;
        generate, at the hyper-converged computing device by the hyper-converged application, a peripheral signal from the data packet that is configured to be sent to a peripheral device from the plurality of the peripheral devices that corresponds to the virtual desktop, the peripheral signal in a second format compatible with the peripheral device; and
        appropriately route data associated with an exclusive communication between the virtual machines and peripheral devices through the central virtualization switch, wherein the virtualization application and the hyper-converged application are configured on the hyper-converged computing device when the hyper-converged computing device is powered on for the first time.

2. The hyper-converged computing device of claim 1, wherein the hyper-converged application is configured to;
    determine the peripheral device in the peripheral devices that corresponds to the virtual desktop.

3. The hyper-converged computing device of claim 2, wherein determining, the peripheral device comprises:
    determining identification information for the virtual machine, and
    determining the peripheral device that corresponds to the virtual desktop based on the identification information.

4. The hyper-converged computing device of claim 2, wherein the second format is compatible with a converter that is coupled to the peripheral device, and wherein routing the peripheral signal to the peripheral device comprises:
    sending the peripheral signal to the converter, wherein the converter is configured to convert the peripheral signal into a third format compatible with the peripheral device.

5. The hyper-converged computing device of claim 4 wherein the converter is coupled to a set of peripheral devices, each peripheral device in the set of peripheral devices communicating in a different type of the third format, and the converter converts the peripheral signal to a type of the third format associated with the peripheral device.

6. The hyper-converged computing device of claim 4, wherein the converter is a keyboard, video, mouse (KVM) converter configured to convert the peripheral signal to a keyboard compatible signal, a video compatible signal, and a mouse compatible signal and vice versa.

7. The hyper-converged computing device of claim 4, comprising multiple converter interfaces, wherein the hyper-converged application is configured to redirect the peripheral signal to a converter interface specific to the virtual machine prior to routing the peripheral signal to the peripheral device.

8. The hyper -converged computing device of claim 2, wherein the hyper-converged application is configured to:
    receive a peripheral signal Dom the peripheral device;
    determine the virtual machine in the virtual machines that corresponds to the peripheral device;
    generate a data packet from the peripheral signal for the virtual machine; and send the data packet to the virtual machine, the virtual machine processing the data packet for the virtual desktop being run in the virtual machine.

9. The hyper-converged computing device of claim 1, wherein the virtualization application includes a hypervisor, wherein the hyper-converged application includes a management application and a storage block, and wherein the storage block comprises a virtual storage area network (vSAN).

10. The hyper-converged computing device of claim 1, wherein the hyper-converged application is executed in one of the virtual machines.

11. The hyper-converged computing device of claim 1, wherein the hyper-converged computing device is a single rackable enclosure, a two-rack unit-four node (2U/4N) device, or a four-rack unit-four node (4U/4N) device.

12. The hyper-converge computing device of claim 1, further comprising:
at least one container hosted by the hyper-converged computing device, wherein the hyper-converged application is configured to appropriately route data associated with an exclusive communication between the at least one container and a corresponding one of the peripheral devices through the central virtualization switch that is integrated with the server.

13. A method, comprising:
executing a virtualization application for managing virtual machines hosted by a hyper-converged computing device including pretested, preconfigured, and pre-integrated one or more servers and a central virtualization switch;
executing a hyper-converged application for managing the hyper-converged computing device, wherein a plurality of peripheral devices connects directly to the hyper-converged computing device, wherein the plurality of peripheral devices comprises a keyboard, a video display unit and a mouse;
receiving, at the hyper-converged computing device by the hyper-converged application, a data packet from a virtual machine of the virtual machines, the data packet received in a first format compatible with a virtual desktop being run in the virtual machine;
generating, at the hyper-converged computing device by the hyper-converged application, a peripheral signal from the data packet that is configured to be sent to a peripheral device from the plurality of the peripheral devices that corresponds to the virtual desktop, the peripheral signal in a second format compatible with the peripheral device; and
routing, at the hyper-converged computing device by the hyper-converged application, the peripheral signal to the peripheral device, the peripheral device processing the peripheral signal for the virtual desktop being run in the virtual machine, through the central virtualization switch, wherein the virtualization application and the hyper-converged application are configured on the hyper-converged computing device when the hyper-converged computing device is powered on for the first time.

14. The method of claim 13, wherein the second format is compatible with a converter that is coupled to the peripheral device, and wherein routing the peripheral signal to the peripheral device comprises:
sending the peripheral signal to the converter, wherein the converter is configured to convert the peripheral signal into a third format compatible with the peripheral device.

15. The method of claim 14, wherein the converter is a keyboard, video, mouse (KVM) converter configured to convert the peripheral signal to a keyboard compatible signal, a video compatible signal and a mouse compatible signal, or vice versa.

16. The method of claim 13, further comprising:
receiving a peripheral signal from the peripheral device, determining the virtual machine in the virtual machines that corresponds to the peripheral device;
generating a data packet from the peripheral signal for the virtual machine; and
sending the data packet to the virtual machine, the virtual machine processing the data packet for the virtual desktop being run in the virtual machine.

17. The method of claim 13, wherein each server comprises at least one central processing unit (CPU), memory, and storage, wherein the virtualization application includes a hypervisor, and wherein the hyper-converged application includes a management application and a virtual storage area network (vSAN).

18. The method of claim 13, wherein generating the peripheral signal from the data packet that is configured to be sent to the peripheral device, comprises:
determining identification information for the virtual machine;
determining the peripheral device that corresponds to the virtual desktop based on the identification information; and
generating the peripheral signal from the data packet that is configured to be sent to the peripheral device.

19. The method of claim 13, wherein the hyper-converged application is executed in one of the virtual machines for managing the hyper-converged computing device.

20. The method of claim 13, wherein generating the peripheral signal from the data packet that is configured to be sent to the peripheral device comprises:
deciphering the data packet of the virtual machine; and
converting the deciphered data packet of the virtual machine into the peripheral signal.

21. The method of claim 13, comprising:
prior to routing the peripheral signal to the peripheral device, redirecting the peripheral signal to a converter interface of the integrated central virtualization switch of the hyper-converged computing device specific to the virtual machine.

22. A non-transitory machine-readable medium storing instructions executable by a processing resource to control a hyper-converged computing device to:
execute a virtualization application for managing virtual machines hosted by the hyper-converged computing device including pretested, preconfigured, and pre-integrated one or more servers and a central virtualization switch:
execute a hyper-converged application for managing the hyper-converged computing device, wherein a plurality of peripheral devices connects directly to the hyper-converged computing device, wherein the plurality of peripheral devices comprises a keyboard, a video display unit and a mouse;
receive a data packet from a virtual machine of the virtual machines, the data packet received in a first format compatible with a virtual desktop being run in the virtual machine;
generate a peripheral signal from the data packet that is configured to be sent to a peripheral device from the plurality of the peripheral devices that corresponds to the virtual desktop, the peripheral signal in a second format compatible with the peripheral device; and route the peripheral signal to the peripheral device, the peripheral device processing the peripheral signal for the virtual desktop being run in the virtual machine, through the central virtualization switch, wherein the virtualization application and the hyper-converged application are configured on the hyper-converged computing device when the hyper-converged computing device is powered on for the first time.

23. The non-transitory machine-readable medium of claim 22, wherein the second format is compatible with a converter that is coupled to the peripheral device, and wherein routing the peripheral signal to the peripheral device comprises:

sending the peripheral signal to the converter, wherein the converter is configured to convert the peripheral signal into a third format compatible with the peripheral device.

24. The non-transitory machine-readable medium of claim 23, wherein the converter is a keyboard, video, mouse (KVM) converter configured to convert the peripheral signal to a keyboard compatible signal, a video compatible signal and a mouse compatible signal, or vice versa.

25. The non-transitory machine-readable medium of claim 22, further comprising:

receiving a peripheral signal from the peripheral device;

determining the virtual machine in the virtual machines that corresponds to the peripheral device;

generating a data packet from the peripheral signal for the virtual machine; and sending the data packet to the virtual machine, the virtual machine processing the data packet for the virtual desktop being run in the virtual machine.

26. The non-transitory machine-readable medium of claim 22, wherein each server comprises at least one central processing unit (CPU), memory, and storage, wherein the virtualization application includes a hypervisor, and wherein the hyper-converged application includes a management application and a virtual storage area network (vSAN).

27. The non-transitory machine-readable medium of claim 22, wherein the hyper-converged application is executed in one of the virtual machines for managing the hyper-converged computing device.

28. The non-transitory machine-readable medium of claim 22, comprising:

prior to routing the peripheral signal to the peripheral device, redirecting the peripheral signal to a converter interface of the integrated central virtualization switch of the hyper-converged computing device specific to the virtual machine.

* * * * *